Feb. 17, 1942.  E. L. MILLER  2,273,328
SOLENOID OPERATED BRAKE
Original Filed March 13, 1939
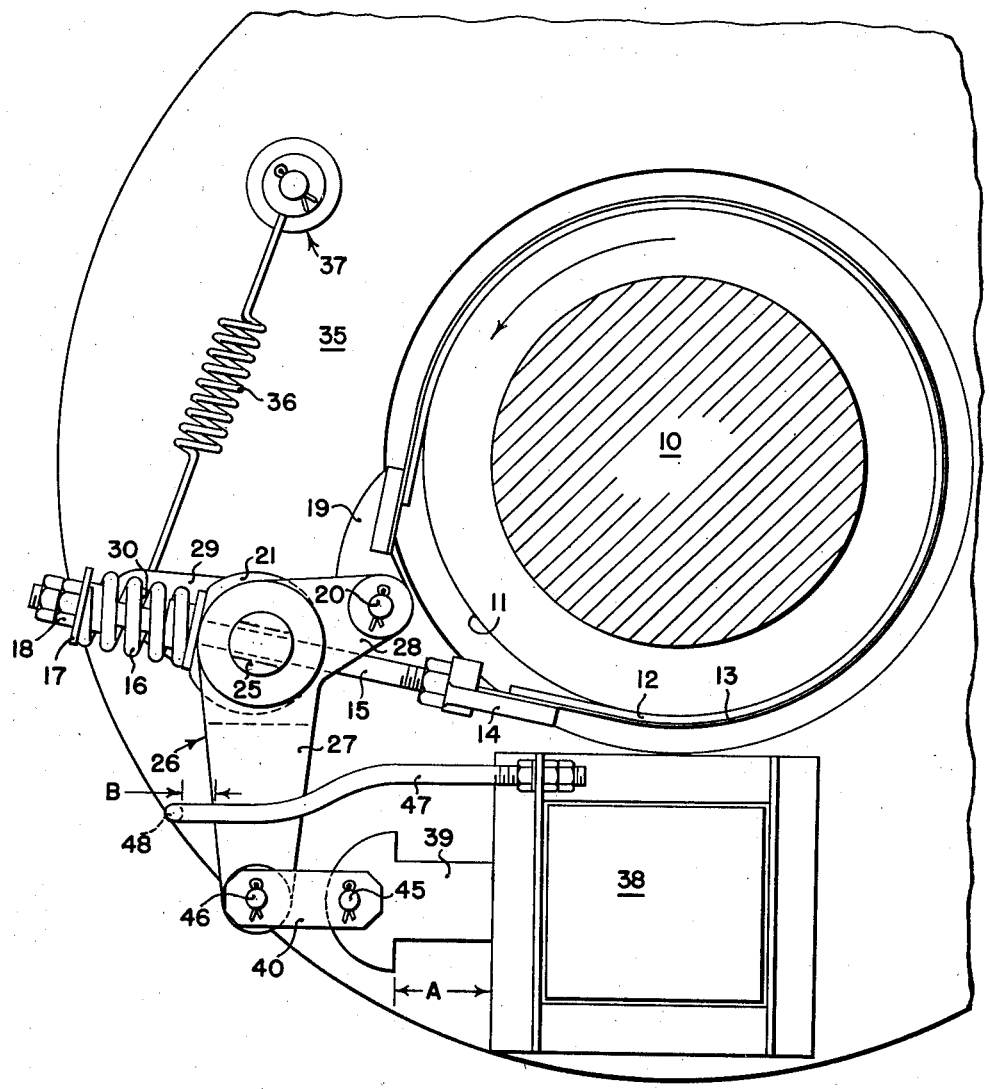
INVENTOR:
EDWARD L. MILLER
BY *Bruno Lechler*
ATTORNEY.

UNITED STATES PATENT OFFICE 2,273,328

SOLENOID OPERATED BRAKE

Edward L. Miller, Moline, Ill., assignor to American Machine and Metals, Inc., New York, N. Y., a corporation of Delaware Application March 13, 1939, Serial No. 261,416
Renewed March 2, 1940

2 Claims. (Cl. 188—171)

The present invention relates to a novel and improved solenoid operated brake.

Band brakes are well suited to stopping a shaft which always revolves in one direction because the force applied to the front end of the band is augmented by the wrapping action of the brake band itself and the larger force which is effective in braking is transmitted to an anchorage. A small force applied to or removed from the head of the band brake will create and control a much larger braking force.

Band brakes are particularly well adapted to stopping gyrating shafts such as centrifugal extractor spindles, since the flexible band can adapt itself to the oscillating brake drum.

In many types of apparatus the most desirable rate of stopping can readily be determined. This rate may be determined by the stress of the parts of the apparatus, or by the ability of the material carried in the apparatus to withstand the braking strain, or by other considerations. Therefore means which automatically provide at each application of the brake a known pull on the head end of the band, such as a spring that is stretched to the point where it exerts a known tension on the band, are desirable means for energizing such a brake. This would be true, for example, in a centrifugal which carries each time about the same load and always has the same speed when the brake is applied.

If a spring applies the brake, means must be provided to overcome the spring tension when the brake is to be released. Frequently the brake is kept fully applied by the spring and only when the machine is to be run the brake band end is drawn back enough to disengage the brake band from the brake. The brake may be interlocked with the driving mechanism so that when power is applied the brake goes off.

As the brake band need move but a small distance in a line tangential to the brake pulley to be applied or released and the force required to return the brake is definitely known if the spring tension applying the brake is known, this is an ideal application for a solenoid controlled by the power circuit. Thus the brake is automatically taken off whenever current is supplied to the motor and automatically applied by the spring when the solenoid dies.

In all brakes there is wear on the brake lining. As the brake usually consists of a steel band and a lining of wood, leather, asbestos, or other material between the band and the brake drum the radius of the brake band gradually decreases and so, although the head end of the brake band still moves the same amount from brake on to brake off, both positions are displaced toward the head end. The solenoid travel becomes longer, as it must not only cover the on-off movement but that due to wear on the lining as well.

Where a solenoid is on the line continuously it is advantageous to design it for closed operation. That is, the solenoid must be able to snap into closed position so that the current through the solenoid will be reduced preventing overheating. If the stroke, due to wear of brake bands or misadjustment, becomes so great that the solenoid will not be able to start closing, the current will continue at a high value and cause the solenoid to burn out. Under such conditions the current through the core will be a great many times its proper value.

Hitherto a number of adjustments were found necessary, commonly at least one to take up wear on the brake band, and at least one to regulate the tension of the spring applying the brake. Very often both the front and the rear ends of the brake band are thus adjustably movable. There are several positions of the adjustment that will give the desired braking action but under some combinations of these positions of the adjustment the solenoid armature stroke is longer or the force required greater than under others and so to release the brake tension the solenoid may be over stressed.

The object of this invention is to devise such a simple brake band adjustment that there will be definite assurance that the stress on the solenoid is the same, that the path over which it works is the same, and the braking torque is the same as it was initially.

A further object is to provide a band brake that will always have a predetermined effectiveness if the adjustment is made to bring an indicator back to its initial position.

A further object is to provide a band brake that is applied by a spring giving a predetermined pull when stretched to a given length by a single adjustment which brings the front end of the brake band to a known position.

The drawing shows a plan, partly in section of the invention. A revolving member, 10, always revolving in the direction of the arrow, carries a braking surface, 11. Brake surface 11 is surrounded by a brake lining 12 which is supported upon a flexible brake band 13. This band is relatively stationary, the rear end being attached to a casting 14 which is threaded to admit a rod 15 which, after being screwed into place, is held against rotation by a lock nut. The rod extends through an anchorage abutment to be described later, and is surrounded by a stiff spring 16. It also passes through a washer 17 which rests against spring 16. The end of rod 15 is threaded and an adjustment nut 18, intended to take up wear on the brake band, together with a lock nut are screwed thereon. The other end of the brake band, generally referred to as the forward end because it is in the direction of rotation, is attached to a casting 19 which is pivoted on a T-shaped member at 20. An annular member 21 fits over the stationary stud 25 about which this T-shaped member 26 pivots. The annular stud 21 has a flat surface on one side and a diametrically drilled hole through which the rod 15 may pass freely. This rod also passes through a hole drilled with considerable clearance in stud 25.

It will be seen that the rear end of the brake band draws upon rod 15 which carries the adjustable nut 18 and so transmits the drag on the rear end of the brake through washer 17, stiff spring 16, annular member 21 to the stationary stud 25. The other end of the brake band anchored at 20 to the T-shaped member 26 also transmits stress to the same stud 25. The T-shaped spider 26 has three arms—27, 28, 29. A deep slot which extends down along the central plane divides arms 28 and the hub in two sections which are joined by the arm 27. This permits rod 15 to pass through between the two sections of arm 28 and on through the stud 25. Arm 29 is in the plane of one of the sections of arm 28 and carries an anchorage hole 30 to which a spring is anchored.

It will thus appear that by drawing upwards upon arm 29 a stress may be transmitted to the brake band 20 and this stress, augmented by the wrapping action of the brake band when the machine is running, will result in the larger stress on rod 15 and this stress is transmitted through the spring 16 to the stud 25.

The brake is normally applied. That is, the revolving element 10 is not normally free to rotate. The brake is applied by a spring which is also carried by the main casting 35 which supports all parts of the brake. The spring, 36, is non-adjustable and has a specified length and extension characteristics, one end being anchored in hole 30, the other end anchored on stud 37. Both studs 37 and 25 are carried by the main casting 35.

In order to release the brake a solenoid 38 is mounted on main casting 35. The solenoid is equipped with an armature 39 which is connected by a link 40 with arm 27. Pins 45 and 46 serve as pivot points in the armature 39 and the arm 27 respectively. An adjustable stop is carried on the bent rod 47 which is supported by the solenoid housing 38. The end of this bent rod 48 limits the movement of the long leg 27 of the T-shaped member 26. When B, the distance between arm 27 and stop 48 becomes zero, a portion of the tension which spring 36 creates in the brake band is lost and the brake ceases to be effective. When the distance B becomes zero the travel of solenoid armature 39, distance A, is at its maximum.

When this brake is installed on a machine the solenoid 38 is connected with the motor circuit, or the motor control circuit, in such manner that current will pass through the solenoid whenever current is applied to the motor driving the machine. Whenever a force is applied the armature 39 of the solenoid will move inward the entire distance A, which will release the forward end 19 of the brake band. As the brake band is lifted off the brake drum the stress at the other end of the brake band will also become zero and the heavy spring 16 will move a short distance, allowing the nut 18 to move backward a bit and spring 16 to expand and spring 36 will be further expanded. When the current on the machine is cut off the driving torque of the driving motor no longer tends to turn over the shaft 10 but the inertia of the equipment driven by shaft 10 tends to keep it turning in the same direction. The solenoid 38 releases armature 39 and spring 36 contracts. As this spring has no adjustment but has been selected so that when installed on this particular brake it will draw up the brake band 12 to give precisely the proper tension on the brake, the machine will always be stopped by the application of the same braking torque and its speed reduced at the same rate.

The wear of the brake band 12 against the brake surface 11 will gradually reduce the thickness of band 12 and at the same time the radius of the brake band 13 will be decreased. As a result of this decreased radius of the brake band it will now seem longer and end 19 will move forward further than before allowing spring 36 to pull the T-shaped member 26 through a slightly larger angle, reducing the distance B and increasing the distance A. When the machine is initially shipped the distance A is a specified amount, such as ½″. This distance is such that even though it decreases to zero and the travel of the solenoid armature A be correspondingly increased, the armature 39 will not be withdrawn so far but that the solenoid 38 may promptly and readily draw in the armature.

When the wear of the brake band has caused distance B to become so short that when the brake is applied, that is when the machine stands at rest and no current is on, the distance B is almost zero, it is time to adjust the brake. There being but a single adjustment, nut 18, it follows that whenever the adjustment is made by drawing in on the rod 15 until the distance B again equals the distance initially specified the original stress conditions will be re-established and the brake will be applied with precisely the same intensity as before wear took place.

As the solenoid armature starts from its initial position it is obvious that the adjustment cannot change the load conditions on the solenoid.

The invention in its broader aspects is not limited to the specific mechanism which has been selected to illustrate one application. Departures may be made therefrom within the scope of the accompanying claims without departing from the principles of the invention and without sacrificing its chief advantages.

What I claim is:

1. A brake comprising a revolving drum surrounded by a brake band anchored at one end, drawn up at the other by a spring and released by a solenoid, having in combination a cylindrical brake drum, a flexible brake band capable of engaging the brake drum and having limited bodily circumferential movement, a stationary stud supporting a spider and the rear end of the brake band, one arm of the spider connected to the front end of the brake band, a tension spring connected to another arm of the spider and to a fixed abutment, the spring tending to draw the spider arm toward the abutment so as to wrap the brake band around the brake drum and to move the front end of the brake band forward in the direction of rotation until the slack is taken up, a solenoid connected to the spider tending to draw the bell crank in the direction opposite to that of the spring, releasing the brake band, an indicator showing the position of the front end of the brake band, the spider, and the solenoid armature when the brake is applied; the position of the indicator relative to indicated limits showing that the brake band, spring and solenoid will all be stressed in the manner intended and function to best advantage; a rod connected to the rear end of the brake band passing through the stud, a single adjustment on the rod drawing the rear end of the brake band closer to the stud and thus bodily moving the brake band around the brake drum until the indicator connected with the forward end falls within the limits giving effective operation.

2. A brake comprising a revolving drum surrounded by a brake band anchored at one end, drawn up at the other by a spring and released by a solenoid, having in combination, a cylindrical brake drum, a flexible brake band capable of engaging the brake drum, a stationary stud supporting a spider and also the anchored end of the brake band, one arm of the spider connected with the front end of the brake band, a spring connected to the spider and a fixed abutment, the spring tending to rotate the spider so as to wrap the brake band around the brake drum, a solenoid connected to the spider adapted to rotate the spider in the reverse direction, releasing the brake band, an indicator showing the position of the front end of the brake band, the spider and the solenoid armature when the brake is applied; the position of the indicator relative to indicated limits showing whether the brake band, spring and solenoid are all stressed to function to best advantage; a single adjustment between the anchored end of the brake band and the stud by which the brake band may be bodily moved around the brake drum until the indicator connected with the forward end shows the adjustment to be within the limits of effective operation.

EDWARD L. MILLER.